(12) United States Patent
Schafheutle et al.

(10) Patent No.: US 7,199,184 B2
(45) Date of Patent: Apr. 3, 2007

(54) AQUEOUS STOVING ENAMELS

(75) Inventors: Markus A. Schafheutle, Graz (AT); Julius Burkl, Graz (AT); Anton Arzt, Neutillmitsch (AT); Gerlinde Petritsch, Graz (AT); Rudolf Jedlicka, Wiener Neustadt (AT); Joerg Wango, Wundschuh (AT)

(73) Assignee: Surface Specialties Austria GmbH (AT)

( * ) Notice: Subject to any disclaimer, the term of this patent is extended or adjusted under 35 U.S.C. 154(b) by 206 days.

(21) Appl. No.: 10/945,643

(22) Filed: Sep. 21, 2004

(65) Prior Publication Data
US 2005/0065277 A1   Mar. 24, 2005

(30) Foreign Application Priority Data
Sep. 24, 2003 (AT) ............................... A 1512/2003

(51) Int. Cl.
- C08G 73/02 (2006.01)
- C08J 3/00 (2006.01)
- C08K 3/20 (2006.01)
- C08L 75/00 (2006.01)
- B05D 3/02 (2006.01)

(52) U.S. Cl. ............... 524/591; 427/372.2; 427/385.5; 428/423.1; 524/589; 524/590; 524/839; 524/840; 525/440; 525/441

(58) Field of Classification Search ............... 524/589, 524/590, 591, 839, 840; 525/440, 441; 427/372.2, 427/385.5
See application file for complete search history.

(56) References Cited

U.S. PATENT DOCUMENTS

| | | | | |
|---|---|---|---|---|
| 3,479,310 A | * | 11/1969 | Bayer et al. | 524/591 |
| 3,756,992 A | | 9/1973 | Dieterich | |
| 4,308,184 A | | 12/1981 | Thoma et al. | |
| 4,689,373 A | * | 8/1987 | Auerbach et al. | 525/398 |
| 4,728,542 A | | 3/1988 | Nachtkamp et al. | |
| 5,569,707 A | * | 10/1996 | Blum et al. | 524/591 |
| 6,620,511 B1 | | 9/2003 | Wigger et al. | |
| 2003/0119979 A1 | | 6/2003 | Zander et al. | |

FOREIGN PATENT DOCUMENTS

| | | |
|---|---|---|
| DE | 28 14 173 | 10/1979 |
| DE | 196 09 311 | 9/1997 |
| EP | 0 208 908 | 1/1987 |
| EP | 0 669 352 | 8/1995 |
| WO | WO-01/02457 | 1/2001 |
| WO | WO-01/44335 | 6/2001 |

* cited by examiner

Primary Examiner—Patrick D. Niland
(74) Attorney, Agent, or Firm—Connolly Bove Lodge & Hutz LLP

(57) ABSTRACT

Aqueous stoving enamels containing resins A which have hydroxyl groups and are made hydrophilic by partially neutralized acid groups, and highly etherified aminoplasts B, characterised in that the aqueous solutions or dispersions of the resin have a pH value of 6 or below, a method for the preparation thereof, and a method of use comprising coating thermally sensitive substrates.

6 Claims, No Drawings

AQUEOUS STOVING ENAMELS

FIELD OF THE INVENTION

The present invention relates to aqueous stoving enamels.

BACKGROUND OF THE INVENTION

Aqueous enamels contain resins which form stable solutions or dispersions through ionic (anionic or cationic) or non-ionic stabilization in water. These resins which do not dry purely physically (i.e., without addition of a hardener after removal of the solvent or dispersant, they form a film which is only cross-linked through physical interactions such as dispersion or van der Waals interactions or through hydrogen bridge-type bonds), but rather dry chemically, i.e., through reaction with a hardener or cross-linking agent, have further reactive groups which cross-link with the hardener to form covalent bonds during the curing procedure. With stoving enamels, this cross-linking only sets on at higher temperatures; therefore, in this case mixtures of resin and hardener may be manufactured and stored at room temperature for a long time before the processing. The hardener must either become reactive only at higher temperatures or be sufficiently deactivated by protective groups that no premature cross-linking reaction occurs during storage.

Lowering the cross-linking temperature for these stoving enamels (and thereby saving time and/or energy during the thermal cross-linking), without, however, negatively influencing the storability, is desirable.

If an etherified aminoplast hardener is used for the cross-linking, which reacts with resins containing hydroxyl groups with transetherification and formation of N-methylene ether bonds, the presence of acids as catalysts is necessary. The transetherification only occurs under acid catalysis. For water-dilutable anionically stabilized resins, which are hydrophilically modified by incorporating acid groups and at least partially neutralizing these acid groups, amines are typically used for neutralization. These amines must have, to a large extent, left the enamel film to be cross-linked so that the acids used as the catalyst may become active. At lower temperatures (below 100° C.) the volatility of the amines used for naturalization is still low, however, and therefore the hardening reaction may not yet begin at these temperatures.

SUMMARY OF THE INVENTION

It has now been found that by combining such water-dilutable resins containing hydroxyl groups, which have a sufficient type and/or number of acid groups, and which are simultaneously capable of effectively emulsifying the amino plastic hardener in the mixture of resin and water, with highly etherified amino plastics having a low degree of polymerization, binders for stoving enamels may be provided which may be hardened into mechanically and chemically resistant coatings even at temperatures below 100° C., particularly at temperatures from 75° C. to 98° C.

The present invention therefore relates to aqueous stoving enamels containing resins A, which have hydroxyl groups and are made hydrophilic by partially neutralized acid groups, and highly etherified aminoplasts B, the aqueous solutions or dispersions of the resin having to have a pH value of 6 or below. The resin A acts as an emulsifier for the aminoplast resin B in water in this case. The average degree of polymerization of the aminoplast resins B is preferably at most 1.8, especially preferably at most 1.5, and particularly at most 1.3.

DETAILED DESCRIPTION OF THE PREFERRED EMBODIMENTS

The pH value is determined in this case in a solution or dispersion containing 5 g of the neutralized resin in 100 g of the aqueous solution or dispersion.

The emulsifying action may be proven by the fact that no emulsified particles which only contain the aminoplast resin may be detected in the aqueous system made of resin A and aminoplast hardener B in water, but rather there are only emulsified droplets which contain at least a mass fraction of 5%, preferably 10%, of the resin A.

Preferably, those resins which have acid groups derived from organic sulfonic acids or sulfuric acid semi-esters are used as resins A. Organic sulfonic acids correspond to the formula R—SO$_2$—OH, and sulfuric acid semi-esters correspond to the formula R—O—SO$_2$—OH, R being an organic residue in each case. The acid functionality is incorporated into the resin A via the residue R and/or a functional group on this residue. In a similar way, phosphonic acid groups or phosphoric acid semi-esters having at least one remaining acid hydrogen atom may also be incorporated. It is also possible to incorporate carboxylic acid groups, where it is preferable in this case to increase the acidity through electron-withdrawing groups in the neighborhood of the carboxyl groups. Such electron-withdrawing groups are known to be, for example, chlorine, nitro, and sulfone groups.

Suitable resins A are those which have functional groups which react with aminoplast hardeners by transetherification and are thus cured. Resins containing hydroxyl groups as functional groups are preferred. However, also resins having mercaptan groups or resins with NH groups which are not basic (e.g., amide groups) may be used, these types of reactive groups preferably occuring in the resin together with hydroxyl groups. Polyurethanes are especially preferred as resins A, since sulfonic acid groups and/or phosphonic acid groups may be introduced therein in a simple way. However, it is also possible to incorporate the acid groups cited into other resins, particularly alkyd resins, polyester resins, and epoxide resins.

The resins A containing hydroxyl groups preferably have a hydroxyl value of 5 mg/g to 120 mg/g, especially preferred from 10 mg/g to 100 mg/g, and their acid value originating from carboxylic acid groups is preferably from 0.5 mg/g to 50 mg/g, especially preferred from 5 mg/g to 40 mg/g.

Suitable resins A containing hydroxyl groups are polycondensation resins, particularly polyester resins A1, polyaddition resins such as polyurethanes A2, and polymerization resins such as acrylate copolymers A3.

Suitable polyesters A1 are derived from aliphatic linear, branched, or cyclic polyhydroxy compounds A11, particularly dihydroxy compounds, and aromatic or aliphatic linear, branched, or cyclic polycarboxylic acids A12, particularly dicarboxylic acids. In this case, the dicarboxylic acids and the dihydroxy compounds may also be replaced by hydroxycarboxylic acids A13, particularly by aliphatic linear and aromatic hydroxycarboxylic acids such as hydroxybutyric acid, hydroxyvaleric acid, hydroxycaproic acid, and hydroxybenzoic acid. Up to 10% of the mass of each of the hydroxyl compounds A11 and the compounds containing carboxylic acid groups A12 may contain three or more functional groups in this case. Of course, it is also possible for dihydroxy compounds having an additional acid function or dicarboxylic acids having an additional hydroxyl group to be used. Compounds of this type are, for example, bis (hydroxymethyl)propionic acid, tartaric acid, and dihydroxybenzoic acid.

Suitable polyurethanes A2 are particularly polyester urethanes, which contain components derived from polyester polyols A21, possibly low molar mass polyols A22, multifunctional isocyanates A23, and compounds A24, which contain at least one group reactive to isocyanates selected from hydroxyl groups, amino groups, and mercaptan groups, as well as at least one acid group selected from sulfonic acid groups, sulfuric acid semi-ester groups, phosphonic acid groups, and phosphoric acid semi-ester groups, each having at least one acid hydrogen atom, and carboxylic acid groups, which are activated by electronegative groups in the vicinity, such as a-keto acids or $\alpha$, $\alpha$-dichlorocarboxylic acids. Mixtures of different acid groups may also be used.

Polyurethanes which are suitable for the present invention are preferably manufactured in a two-stage method, the acid groups being introduced in the second stage by reacting a prepolymer terminated with isocyanate groups with the compounds carrying the acid groups. This step may be advantageously combined with the chain extension. The prepolymers terminated with isocyanate groups are obtained in the known way by reacting polyols with multifunctional isocyanates, the latter being used in stoichiometric excess.

Suitable polyacrylate resins A3 are copolymers of olefinically unsaturated monomers A3 1 which contain carboxylic acid groups, olefinically unsaturated monomers A32 which contain hydroxyl groups, and olefinically unsaturated monomers A33 which contain neither hydroxyl groups nor acid groups, and which are selected from the group consisting of esters of aliphatic linear, branched, or cyclic alcohols having 1 to 20 carbon atoms and olefinically unsaturated carboxylic acids having 3 to 10 carbon atoms or olefinically unsaturated dicarboxylic acids having 4 to 10 carbon atoms. Further suitable monomers A34 are aliphatic linear, branched, or cyclic monocarboxylic acids having 2 to 20 carbon atoms.

If, according to a preferred embodiment, polyurethane resins are used as the resins A, a method is advantageously applied in which in a first stage a polyester containing hydroxyl groups is manufactured, which is mixed in the second stage with a compound which has at least two groups reactive towards isocyanate and at least one anionogenic group, and this mixture is reacted with an excess of multifunctional isocyanates, and in the third stage the isocyanate-functional product of the second stage is reacted with a compound, which has at least one sulfonic acid group or a sulfuric acid semi-ester group and at least one group reactive towards isocyanates, to consume the isocyanate groups, and the resin obtained is subsequently neutralized and dispersed in water.

The stoving enamels according to the present invention may be used for coating substrates of all types; they are, of course, particularly suitable for those substrates which may only be coated with two-component systems due to the high stoving temperatures previously required for a one-pack system.

These are above all thermoplastics, papers, and cardboard, as well as textiles such as woven fabrics, nonwoven fabrics, braided and knitted fabrics.

The present invention will be explained by the following examples.

EXAMPLES

Precursor:

11 g diethylene glycol, 18 g 1,4-butane diol, 16.4 g glycol, and 72 g adipic acid were placed in a glass flask with a distillation device and heated slowly to 220° C. From approximately 140° C., it could be observed that water distilled off. The water formed by the reaction was distilled off with increasing temperature and after reaching the maximum temperature until the acid value had fallen below 10 mg/g. Distillation was continued under reduced pressure until the acid value had fallen below 2 mg/g. Subsequently, glycol was added in a sufficient quantity and the mixture was kept for 2 hours at 230° C. under reflux conditions until the OH value reached a value of 50 mg/g. A molten resin which was liquid and clear at room temperature was obtained.

Polyurethane Dispersion A (PUD A) According to the Present Invention 100 g of the resin of the precursor was mixed with 8 g N-methylpyrrolidone, 1.5 g dimethylol propionic acid, and 22.2 g methyl isobutyl ketone (MIBK) and stirred at 40° C. until all components were dissolved homogeneously. A mixture made of 10.4 g (®Desmodur N 3300 (Bayer AG, trimeric 1,6-diisocyanate hexane) and 25.5 g (monomeric) 1,6-diisocyanate hexane was added to the solution. A weak heat tonality was displayed. This mixture was kept at this temperature until the mass fraction of isocyanate (mass of the isocyanate groups —N═C═O, divided by the mass of the dissolved solid component) had fallen below 3.2%. A mixture made of 9.9 g sodium taurinate in water (40%) and 11.6 g diethanol amine was added to the solution. It was stirred further until a homogeneous mass resulted. In this case, the mass component of isocyanate groups had fallen to zero. The resin solution was dispersed in 248.7 g water, and the azeotropic MIBK-water mixture was distilled off. The resulting dispersion was adjusted to a solid mass component of 40% through further addition of deionized water. The resulting polyurethane dispersion had a pH value of approximately 5.5 and a hydroxyl value of 79 mg/g.

Comparative Example Polyurethane Dispersion B (PUD B)

102.2 g of the resin of the precursor was placed in a glass flask together with 1 g diethylene glycol, 6.2 g dimethylol propionic acid, and 33 g N-methylpyrrolidone and dissolved homogeneously through stirring at 40° C. 34 g 1,6-diisocyanate hexane was added to the clear solution, and the mixture was kept at 40° C. until the mass fraction of isocyanate groups had fallen below 4.2%. After adding 9.6 g diethanol amine, the mixture was stirred further until the mass fraction of isocyanate groups had fallen to zero. The acid was neutralized with 3.3 g dimethylol ethanol amine and the resin solution was dispersed in 248.7 g deionized water. A dispersion having a mass fraction of solids of 33% and a pH value of 7.8 was obtained.

Melamine-Formaldehyde Resin Cross-Linking 30 g highly-reactive MF resin of the HMMM type (®Resimene CE 7103, Solutia Inc.) and 0.3 g p-toluene sulfonic acid were added to 100 g of each of the above-mentioned polyurethane dispersions A and B. The homogenized mixture was applied on a glass plate in a 200 μm wet film thickness. After brief ventilation at room temperature, the film was dried for 30 minutes at 80° C. A solvent-resistant film formed.

Solvent Resistance:
(time until the surface of the enamel upon contact with the relevant solvent was visibly affected)

| Solvent | PUD A with MF resin | PUD A without MF resin | PUD B with MF resin |
|---|---|---|---|
| Acetone | 10 s | 2 s | 1 s |
| Xylene | 30 s | 2 s | 1 s |
| Water | 100 s | 11 s | 5 s |

Properties of the film formed:

| | | | |
|---|---|---|---|
| Surface | Smooth | Smooth | Sticky |

What is claimed is:

1. A process for manufacturing aqueous stoving enamels characterised in that in a first stage a polyester containing hydroxyl groups is prepared which is mixed in the second stage with a compound which has at least two groups reactive towards isocyanate and at least one anionogenic group, and this mixture is reacted with an excess of multi-functional isocyanates, and in the third stage the isocyanate-functional product of the second stage is reacted with a compound which has at least one sulfonic acid group or a sulfuric acid semi-ester group and at least one group reactive towards isocyanates, under consumption of the isocyanate groups, and subsequently the resin A obtained is neutralized and dispersed in water, whereupon a highly etherified aminoplast hardener having an average degree of polymerization of at most 1.3 is emulsified in the said mixture of resin A and water such that the aqueous system made of resin A and aminoplast hardener B in water comprises only emulsified droplets which contain at least a mass fraction of 5 % of resin A.

2. The process according to claim 1, characterised in that taurine or a salt of taurine is used in the third stage.

3. A method of use of aqueous stoving enamels prepared according to claim 1, comprising coating thermoplastics, paper, cardboard, or textiles, with the stoving enamels.

4. The aqueous stoving enamels prepared in accordance with claim 1 characterised in that the aqueous solutions or dispersions of the resin have a pH value of 6 or below.

5. The aqueous stoving enamels according to claim 4, characterised in that the resins A have a hydroxyl value of from 5 mg/g to 120 mg/g.

6. The aqueous stoving enamels according to claim 4, characterised in that the resins A have an acid value of 0.5 mg/g to 50 mg/g.

* * * * *